United States Patent [19]

Casper et al.

[11] Patent Number: 5,459,666
[45] Date of Patent: Oct. 17, 1995

[54] TIME AND FUEL DISPLAY

[75] Inventors: Patricia A. Casper, Oxford; Scott R. Smith, Naugatuck; Lorren Stiles, Jr., Roxbury, all of Conn.

[73] Assignee: United Technologies Corporation, Hartford, Conn.

[21] Appl. No.: 166,404

[22] Filed: Dec. 14, 1993

[51] Int. Cl.$^6$ .................... G06F 3/14; G06G 7/70
[52] U.S. Cl. .................... 364/442; 364/424.02; 364/444; 340/973
[58] Field of Search .................... 364/442, 424.01, 364/424.04, 443, 444, 561, 569; 340/945, 971, 973, 972, 979, 980, 461, 438, 439, 459; 73/113, 114; 345/35, 36, 140, 205, 214

[56] References Cited

U.S. PATENT DOCUMENTS

| | | | |
|---|---|---|---|
| 3,612,837 | 10/1971 | Brandau | 364/424.01 |
| 4,218,744 | 8/1980 | Pratt et al. | 364/442 |
| 4,400,779 | 8/1983 | Kosuge et al. | 364/442 |
| 4,583,094 | 4/1986 | Mosier | 340/975 |
| 4,663,718 | 5/1987 | Augello et al. | 364/444 |
| 4,773,015 | 9/1988 | Leland et al. | 364/427 |
| 5,017,916 | 5/1992 | Londt et al. | 364/424.1 |
| 5,070,323 | 12/1991 | Iino et al. | 340/705 |
| 5,231,379 | 7/1993 | Wood et al. | 340/980 |

Primary Examiner—Kevin J. Teska
Assistant Examiner—Tan Q. Nguyen
Attorney, Agent, or Firm—Michael Grillo

[57] ABSTRACT

A mission computer (10) stores a nominal route plan which includes information indicative of the precise arrival time at specific navigation positions, e.g., waypoints, and the planned fuel consumption during travel to the specified waypoints. The mission computer (10) provides a time and fuel display system (15) with the route plan information. The time and fuel display system (15) generates a display (200) which indicates the total distance to be traveled during the mission (202), a distance traveled indicator (212) to reflect the progress of the aircraft along the mission, and a time bar (205) and a fuel bar (207) the height of which with respect to the indicator (212) are indicative of the percentage that the current time and fuel values are over or under the planned values for the current waypoint. The distance traveled indicator (212) is labeled with a waypoint designation (215) which is indicative of the designation of the waypoint towards which the aircraft is currently flying. A mission time display (220) and a fuel reserve display (223) provide a visual indication of the planned arrival time at the final destination and the planned fuel reserve upon arrival at the final destination. A Bingo fuel indicator (225) is provided to indicate the amount of fuel required to fly a direct route, at maximum range airspeed, to the mission end point with a planned fuel reserve.

43 Claims, 3 Drawing Sheets

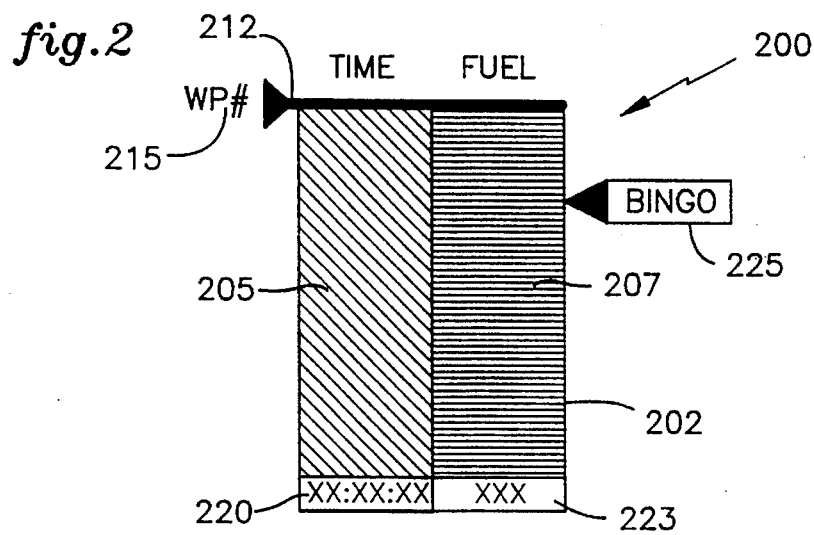
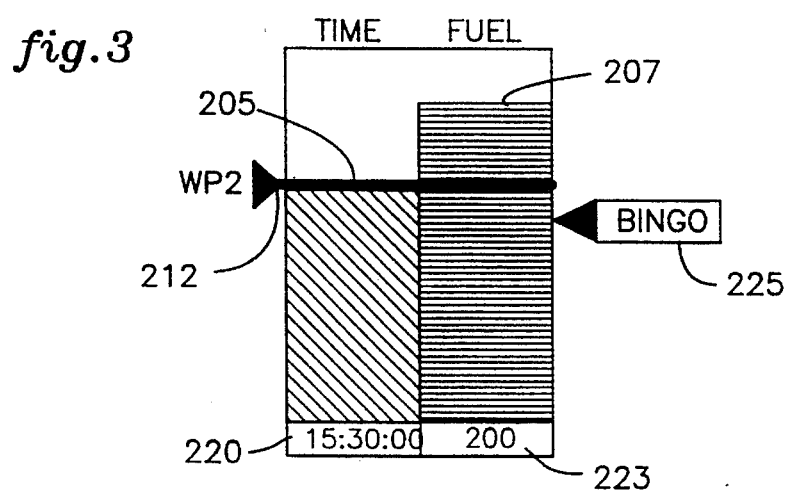
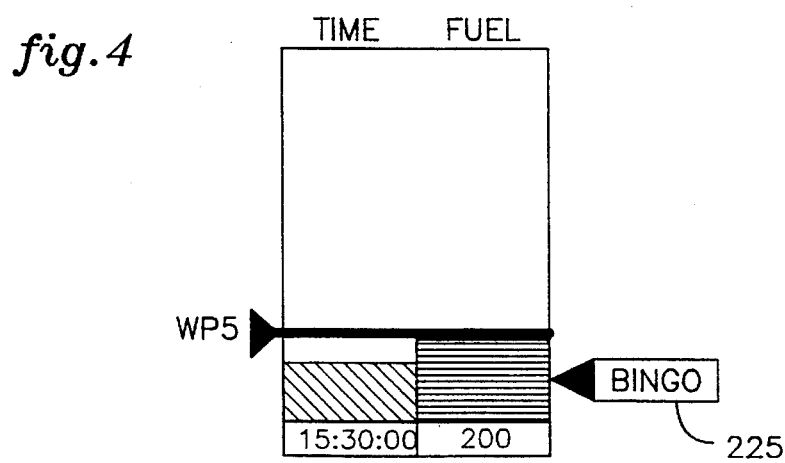

TIME AND FUEL DISPLAY

The Government has rights in this invention pursuant to Contract No. DAAJ02-90-C-0024 awarded by the Department of the Army.

TECHNICAL FIELD

The present invention relates to aircraft status display systems, and more particularly, to a time and fuel display system that provides a continually updated symbolic display of the time the aircraft is ahead or behind of a mission schedule and the amount of fuel consumption relative to planned fuel consumption throughout the mission.

BACKGROUND OF THE INVENTION

During helicopter missions requiring precise arrival at a specified location, time and fuel management can be one of the pilot's most attention demanding tasks, especially during high pilot workload flight operations or when such missions are flown in single pilot aircraft. In addition, mission requirements may involve a greater percentage of high pilot workload flight operations such as Nap of the Earth "NOE", adverse weather, and/or night flying. NOE flight operations involve varying airspeed and altitude in order to fly as close to the earth's surface as vegetation, obstacle, and light conditions will allow. NOE flight is used to limit exposure to threat weapons systems and to increase survivability, and requires almost constant pilot head-up and eye out the window attention to maintain ground and obstacle clearance. Additionally, the flying pilot must keep hands on the flight controls the majority of the time as adjustments to the flight path occur continuously.

In a two pilot aircraft, one pilot scans the world outside the cockpit while the other cross checks the instrument displays to monitor the aircraft while navigating. Any requirements to shift the flying pilot's visual attention inside the cockpit or move the pilot's hands from the grips at these altitudes significantly increases pilot workload and the risk of the mission.

While the tasks of computing remaining time and fuel are often given a lower priority than terrain and obstacle avoidance, errors in computing those parameters may result in serious consequences. Frequently during a mission the pilot needs to know whether the current rate of speed will mean an early or late arrival at a specified location, and whether fuel is being consumed faster than had been anticipated. These calculations must accommodate changes in speed due to terrain, threats, or weather, and must be constantly adjusted. On a typical mission the pilot periodically checks the current values of each of these parameters and compares them to the values obtained when the flight plan was last updated. Discrepancies between actual and planned time and fuel values can be compensated for by either altering the aircraft speed (within limits) or by changing the planned course or arrival time to accommodate the actual values. Errors in arrival timing can result in an unplanned encounter with the enemy or with friendly artillery, or a missed fuel rendezvous. Discrepancies in fuel consumption may indicate flight at speeds or in conditions other than those planned. Additionally, excess fuel consumption could indicate a possible aircraft fault affecting fuel flow and consumption. Insufficient fuel reserves can result in an aborted mission or the loss of the aircraft. Fuel management calculations require a high degree of mental effort, and can divert the pilot's attention away from higher priority tasks such as terrain and threat avoidance.

SUMMARY OF THE INVENTION

Objects of the invention include the provision of a time and fuel display system which presents time and fuel information to a pilot in a concise, expedient manner, so that the pilot may maintain situation awareness without sacrificing safety.

A further object of the present invention is to provide a time and fuel display system that provides a pilot with continuous time and fuel consumption information relative to a mission plan in a symbolic format that is optimized for discriminability and compatibility with the pilot's visual system.

According to the present invention, a mission computer is responsive to operator inputs for storing a nominal route plan which includes information indicative of the precise arrival time at specific navigation positions, e.g., waypoints, and the planned fuel consumption during travel to the specified waypoints; the mission computer provides a time and fuel display system with signals indicative of the planned distance to be covered during the mission, the planned time to cover the distance, and the planned fuel consumption during the mission; the time and fuel display system generates a display which indicates the total distance to be traveled during the mission, and having a distance traveled indicator to reflect the progress of the aircraft along the mission, e.g., the proportion of the total distance that has been flown; the display is further provided with a time indicator (time bar) and a fuel indicator (fuel bar) which indicate the percentage that the current time and fuel values are over or under the planned values for the current progress in the mission.

In further accord with the present invention, the distance traveled indicator is labeled with a waypoint designation which is indicative of the designation of the waypoint towards which the aircraft is currently flying, the height of the time and fuel bars with respect to the indicator being indicative of the percentage that the current time and fuel values are over or under the planned values for the current waypoint, the waypoint indication changing once the position of the aircraft is within a threshold distance of the designated waypoint position.

In still further accord with the present invention, the time and fuel display system provides a visual indication of the planned fuel reserve upon arrival at the final destination and the planned arrival time at the final destination, and a Bingo fuel indicator is provided to indicate the amount of fuel required to fly a direct route, at maximum range airspeed, to the mission end point with the planned fuel reserve.

The time and fuel display system of the present invention has utility for all aspects of helicopter flight operations, and is particularly useful during Nap of the Earth flight operations and other high pilot workload flight conditions. A significant amount of information relating to time and fuel management is presented in a concise, expedient manner, so that the pilot may maintain situational awareness at all times without sacrificing flight safety. The time and fuel display system is operative to provide a pilot with continuous and up to date visual cues regarding time and fuel consumption. By treating the quantities of time and fuel as resources, the pilot is provided with a display which is indicative of the difference between the planned rate of resource consumption and the actual rate of resource consumption.

The foregoing and other objects, features, and advantages of the present invention will become more apparent in light of the following detailed description of exemplary embodiments thereof, as illustrated in the accompanying drawings.

BRIEF DESCRIPTION OF THE DRAWINGS

FIG. 2 is a plan view of a time and fuel display symbol provided by the system of FIG. 1;

FIG. 3 is a plan view of an example time and fuel display symbol;

FIG. 4 is a plan view of another example of a time and fuel display symbol; and

BEST MODE FOR CARRYING OUT THE INVENTION

The time and fuel display system of the present invention is particularly well suited for providing a graphical portrayal comparing the planned rate of time and fuel consumption to the actual rate of time and fuel consumption in a concise and expedient manner, so that the pilot may maintain a situational awareness without sacrificing safety. The system will be described hereinafter with respect to a CRT display located in a helicopter cockpit; however, the system and symbol of the present invention may be used with any type of display unit for displaying graphical information to a pilot, and further, the system may be used with any type of vehicle wherein information indicative of the actual rate of time and fuel consumption compared to the planned rate of time and fuel consumption is desired.

Figure 1:
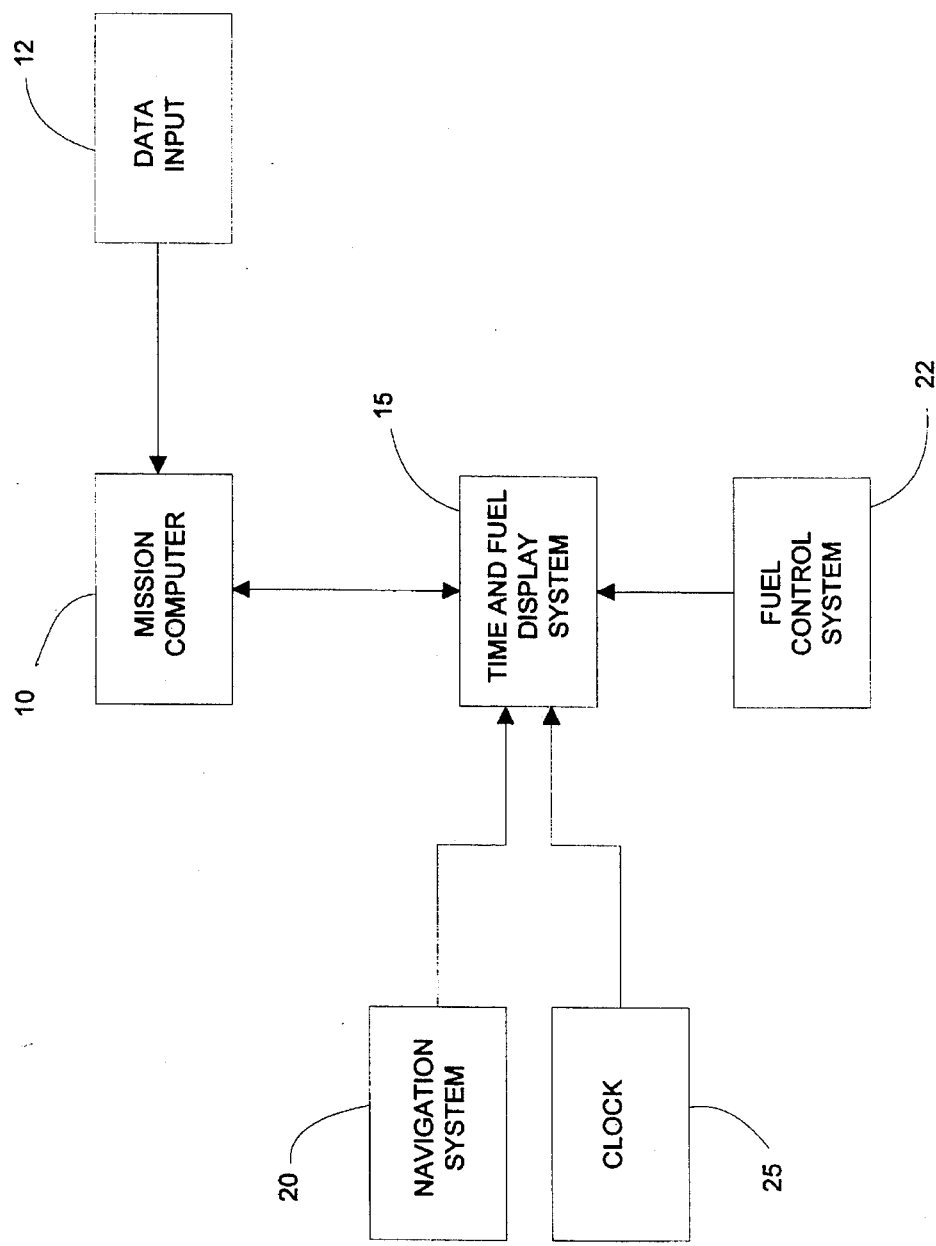
FIG. 1 is a schematic block diagram of the time and fuel display system of the present invention.

Referring to FIG. 1 a mission computer 10 is provided with data indicative of a nominal flight plan via a data input device 12, e.g. a keyboard, floppy disk drive, tape drive or other suitable data input device. The nominal flight plan includes information indicative of a mission or flight path to be flown by a helicopter. The flight plan includes specific navigational sites, i.e., waypoints, to be flown over or to by the helicopter during execution of the mission. Additionally, the specific time of arrival of the helicopter at each of the waypoints and the expected fuel consumption during travel of the helicopter to the waypoints is computed. As is well known in the art, the fuel consumption can be calculated based on the type of helicopter, environmental conditions, e.g., air temperature and planned flight altitude, and operational conditions, e.g., aircraft weight and the planned speed of the helicopter during travel between the waypoints.

In response to the nominal route plan data, the mission computer 10 computes various information related to the route plan including the specific arrival time at each waypoint, the total fuel consumption, the planned fuel remaining at the end of the mission, the total distance to be traveled, and other pertinent flight information which is provided to a time and fuel display system 15. The time and fuel display system 15 is also provided with information indicative of the current navigational position of the helicopter from a navigation system 20. As is known in the art, the navigation system 20 may include a number of sensors including a doppler system, global positioning system, and/or other systems for providing information indicative of the navigational position of the helicopter. The navigation system thereafter uses the navigation information to determine the best or most likely position of the helicopter. That position is provided to the time and fuel display system 15.

A fuel control system 22 provides the time and fuel display system with information indicative of the amount of fuel remaining or the amount of fuel consumed, and the rate of fuel consumption. Finally, a clock 25 provides the time and fuel display system with information indicative of the current elapsed (mission) time.

The time and fuel display system may be implemented using a micro-processor, micro-computer, or other suitable signal processing equipment. Although the time and fuel display system and the mission computer are illustrated as being separate components, they may be implemented by using separate software subroutines within a single micro-processor, micro-computer or other signal processing apparatus.

Referring now to FIG. 2, the time and fuel display 200 comprises a total distance display 202 which includes a time indicator (time bar) 205 and a fuel indicator (fuel bar) 207. As will be described in greater detail hereinafter, the time bar 205 indicates the percentage that the current time is greater than or less than the planned time for the current helicopter position. Similarly, the fuel bar 207 indicates the percentage that the current fuel level is greater than or less than the planned fuel level for the current helicopter position.

The display 200 is also provided with a distance traveled indicator (waypoint line) 212 and a current waypoint indicator 215. The distance traveled indicator 212 is a line running through the total distance display 202, and continually moves downward as the mission progresses to thereby reflect the progress of the helicopter along the mission. Therefore, the distance traveled indicator 212 is indicative of the proportion of the total distance that has been flown thus far on the mission. The waypoint indicator 215 is indicative of the waypoint which the aircraft is traveling towards. For example, if the helicopter is between the mission start point and the first waypoint, then the waypoint indicator will be marked as waypoint one (WP1) because the aircraft is traveling towards the first waypoint. Similarly, if the aircraft reaches WP1 and begins traveling towards waypoint two (WP2), the waypoint indicator will indicate WP2.

The time and fuel display 200 is also provided with a destination arrival time indicator 220 and a planned or mission fuel reserve (MFR) indicator 223. The destination arrival time 220 is indicative of that time which is the planned completion or arrival at the distance represented by the total distance or height of the time and fuel display. MFR is that amount of fuel planned to be remaining upon arrival at the destination. A "Bingo" fuel indicator 225 is also provided. Bingo fuel is defined as that amount of fuel required for the aircraft to fly a direct route at the maximum range airspeed, e.g., the airspeed at which the helicopter can achieve the maximum range, to a pre-selected location, e.g., a refueling location, base, the mission final destination, etc., with the planned fuel reserve. Therefore, if the height of the fuel bar is below the Bingo fuel indicator, there is not sufficient fuel to fly a direct route to the mission final destination with the MFR remaining upon arrival at the destination.

When the system is initialized with data indicative of the nominal route plan, the time and fuel display will look like the time and fuel display of FIG. 2 except that the waypoint indicator 215 will indicate WP1, the destination arrival time will contain a time corresponding to the planned destination arrival time, and the planned reserve fuel indicator 223 will contain a number corresponding to the number of Kg's of fuel planned to be remaining upon arrival at the destination.

The height of the time and fuel display is fixed, and therefore, the scale or increments of the display will vary based on the planned total distance traveled. The scale will also depend on the resolution of the equipment used to display the time and fuel display, and the height selected for the time and fuel display. For example, if the height of the time and fuel display is 100 lines (pixels), then during operation of the display, if the total distance traveled during the mission is 100 Km, each line of the display will represent 1 Km. In this example, as the helicopter travels each Km, the distance indicator 212 will move down one line for each Km traveled. Similarly, if the total distance planned to be traveled during the mission is 400 Km, each line represents 4 Km, and the waypoint line moves down 1 line after the aircraft travels 4 Km.

As mentioned hereinabove, the height of the time and fuel bars 205 and 207 are determined by the percentage that the current time and fuel values are over or under the planned values for the current waypoint. When time and fuel are being consumed as planned, the time and fuel bars are the same height as the waypoint line. When the aircraft is projected to arrive late at the current waypoint with respect to the planned arrival time, the time bar will reflect the proportionate number of seconds late by drawing the time bar that amount below the current waypoint line. Similarly, over consumption of fuel is shown by drawing the fuel bar below the current waypoint line. An excess in time or fuel, e.g., when the aircraft will be early or will arrive at the current waypoint with more than the planned amount of fuel, are conveyed by drawing the time and fuel bars above the current waypoint line, the amount above being proportionate to the amount of excess of each of those resources. If the pilot hovers the aircraft, the waypoint line remains stationary for the duration of the hover and the time and fuel bars move down as time and fuel are consumed.

Any changes to the mission plan, i.e., the nominal route plan, will change the scale of the display, since the total height of the display reflects the total distance to be traveled. Additionally, a change in the flight plan may cause changes in the relative position of the waypoint indicator. Likewise, the positions of the tops of the time and fuel bars with respect to the waypoint line may be affected by the change to the flight plans, to the extent that planned time and fuel values are adjusted to match the actual consumption values.

The operation of the time and fuel display is best understood by example. Referring to FIG. 3, the time and fuel display indicates that the aircraft is currently flying towards the second waypoint (WP2), and that the aircraft is approximately ⅓ of the way through the entire distance to be traveled during the mission as indicated by the waypoint line 212 being approximately ⅓ of the way down the total distance scale 202. As indicated by the time bar 205, the mission is proceeding on time because the top of the time bar is equivalent with the waypoint line. Additionally, the fuel bar 207 indicates that the aircraft has approximately 30% more fuel than that planned to be remaining at WP2. The display also indicates that the planned arrival time at the final destination 220 is 15:30:00, e.g. 3:30 p.m., and that approximately 200 Kg's of fuel is the planned fuel reserve 223 to be remaining upon arrival at the final destination. The position of the Bingo fuel indicator 225 with respect to the top of the fuel bar indicates that the aircraft has more than enough fuel to arrive at the final destination.

Referring now to the example of FIG. 4, the time and fuel display indicates that the aircraft is now proceeding towards WP5, and is approximately ⅔ of the way through the entire distance to be traveled. The aircraft is behind schedule as indicated by the time consumption being approximately 30% greater than planned for WP5. Additionally, the fuel consumption is on schedule.

Figure 5:
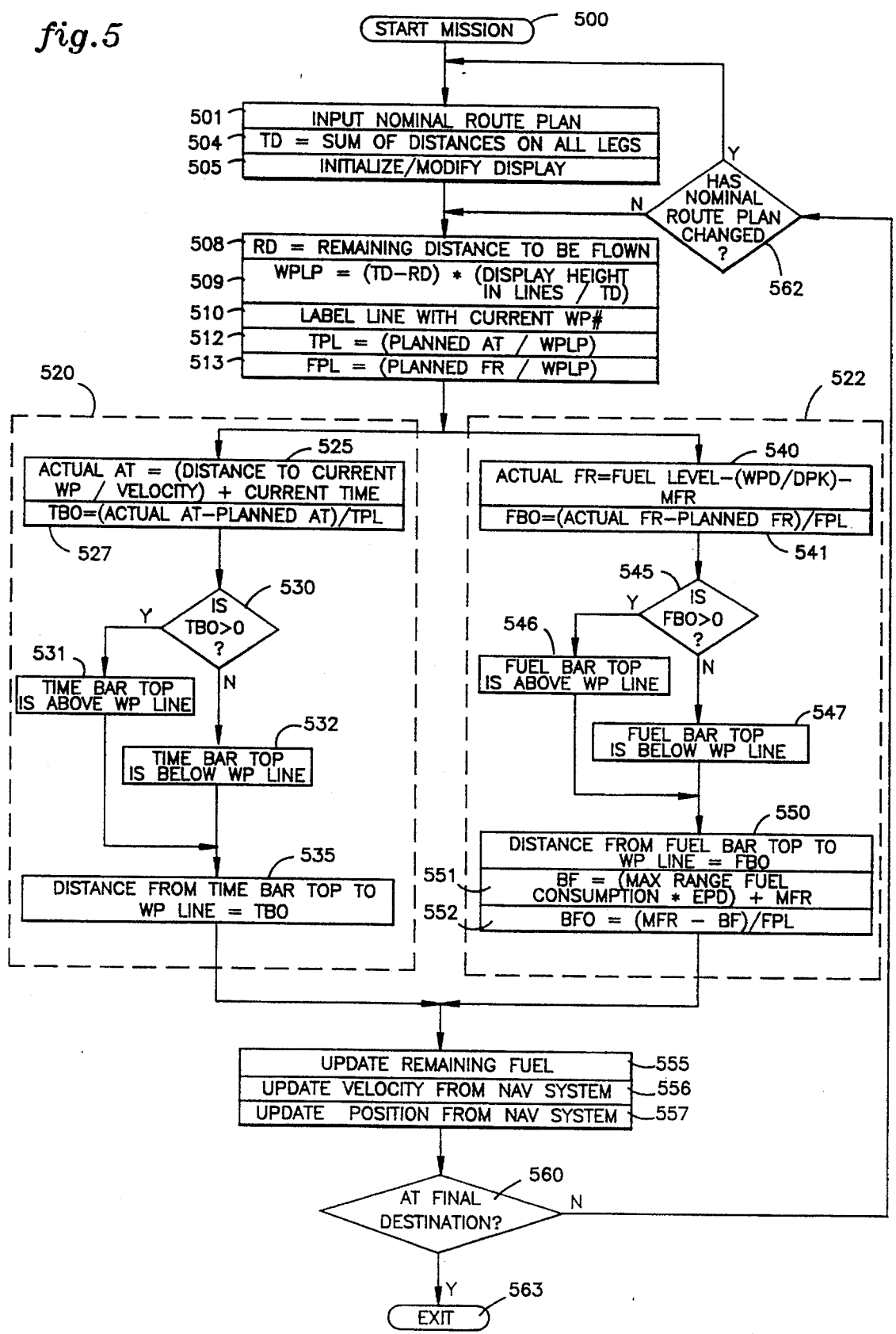
FIG. 5 is a logic flow diagram utilized by the time and fuel display system of FIG. 1 for providing the time and fuel display symbol of FIG. 2.

As described hereinabove the time and fuel display system of the present invention may be implemented using a micro-processor, microcomputer, or other signal processing equipment. The time and fuel display system may use the subroutine illustrated in FIG. 5 for providing the time and fuel display. Referring to FIG. 5, the subroutine is entered in a step 500, and then a step 501 is performed wherein the nominal route plan is entered into the mission computer. Next, steps 504 and 505 are consecutively performed wherein the total distance (TD) to be traveled during the completion of the nominal route plan is calculated, and the display is initialized using the total distance. As described hereinabove, the display scale during initialization of the display is determined by dividing the total distance by the number of lines which make up the display. The result is the total distance which each line of the display represents. If the nominal route planned is changed during a mission, then the display is modified in steps 504 and 505 based on the change in TD.

Next, a step 508 is performed wherein the remaining distance (RD) to be flown during the mission is calculated. When the mission first starts, the remaining distance will be equal to the total distance. Step 509 is then performed wherein the waypoint line position (WPLP) is determined using equation 1 below:

$$\text{WPLP}=(\text{TD}-\text{RD})*(\text{DH}/\text{TD}) \tag{1}$$

where DH is equal to the display height in lines. WPLP represents the distance down from the top of the total distance display 202 (FIG. 2) that the distance traveled indicator 212 (FIG. 2) is drawn.

Next, a step 510 is performed wherein the waypoint indicator is placed next to the waypoint line. The waypoint indicator is determined based on the current position of the aircraft with respect to the waypoints. Steps 512 and 513 are then consecutively performed wherein the time and fuel display scales are determined using equations 2 and 3 below:

$$\text{TPL}=(\text{PLANNED AT}/\text{WPLP}) \tag{2}$$

$$\text{FPL}=(\text{PLANNED FR}/\text{WPLP}) \tag{3}$$

where TPL is the time per line, e.g., the time represented by each line in the time and fuel display, planned AT is the planned arrival time at the current waypoint, FPL is the fuel per line, e.g., the Kg's of fuel represented by each line in the time and fuel display, and planned FR is the planned Kg's of fuel remaining at the current waypoint minus MFR (223 in FIG. 2).

As shown in equations 2 and 3, the time scale and the fuel scale are variable depending upon the relative position of the aircraft to the current waypoint and the waypoint line position. The time per line or time scale is equal to the planned arrival at the current waypoint divided by the current waypoint line position, and the fuel per line or fuel scale is equal to the planned fuel remaining at the current waypoint divided by the waypoint line position.

Next, a time bar subroutine 520 and a fuel bar subroutine 522 are simultaneously performed to position the tops of the time and fuel bars with respect to the waypoint line. In the time bar subroutine, a step 525 is performed wherein the actual arrival time at the current waypoint is computed using equation 4 below:

$$\text{ACTUAL AT} = (\text{WPD}/V) + T \tag{4}$$

where WPD is the distance to the current waypoint, v is the velocity of the helicopter, and T is the current time.

Next, the time bar offset (TBO) is calculated in a step 527 based on the actual arrival time computed in the step 525. The time bar offset is the distance from the top of the time bar to the waypoint line, and is computed using equation 5 below:

$$\text{TBO} = (\text{ACTUAL AT} - \text{PLANNED AT})/\text{TPL} \tag{5}$$

Test and steps 530 through 535 are performed to determine the position of the time bar with respect to the waypoint line. In test 530, the subroutine checks if the time bar offset is greater than zero. If the time bar offset is greater than zero, this indicates that there is excess time, e.g., the aircraft is ahead of schedule. Similarly, if the time bar offset is less than zero, there is a time deficient, e.g., the aircraft is behind schedule. If the results of the test 530 are positive the aircraft is ahead of schedule and a step 531 is performed wherein the time bar top is positioned above the waypoint line. Similarly, if the results of the test 530 are negative, there is a time deficient, and a step 532 is performed wherein the time bar top is positioned below the waypoint line. Finally, a step 535 is performed wherein the actual distance from the time bar top to the waypoint line is set equal to the time bar offset calculated in the step 527.

The fuel bar subroutine 522 is similar to the time bar subroutine 520. First, a step 540 is performed wherein the actual fuel remaining at the current waypoint is calculated using equation 6 below:

$$\text{ACTUAL FR} = \text{CURRENT FUEL LEVEL} - (\text{WPD}/\text{DPK}) - \text{MFR} \tag{6}$$

where WPD is the distance to the current waypoint, and DPK is the distance per Kg of fuel, e.g., the rate of fuel consumption.

In equation 6 above, the actual fuel remaining is calculated based on the distance to the current waypoint and the distance per Kg of fuel, which is the fuel consumption per distance, minus the mission fuel reserve. The fuel consumption is determined using a fuel flow gage or by differentiating the output of a fuel level gage with respect to time. Alternative, a look up table may be used to determine fuel consumption based on the current speed, e.g., velocity, altitude, temperature and other conditions which affect fuel consumption. Next, step 541 is performed wherein the fuel bar offset (FBO) is calculated. The fuel bar offset is the distance from the fuel bar top to the waypoint line and is calculated using equation 7 below:

$$\text{FBO} = (\text{ACTUAL FR} - \text{PLANNED FR})/\text{FPL} \tag{7}$$

Test and steps 545 through 550 are performed to determine the position of the fuel bar top with respect to the waypoint line. In test 545, the subroutine checks if the fuel bar offset is greater than zero. If the fuel bar offset is greater than zero, than there is excess fuel, e.g., the aircraft has consumed less fuel than planned at this point in the mission. Similarly, if the fuel bar offset is less than zero, there is a fuel deficit, e.g., the aircraft has consumed more fuel than planned for this point in the mission. If the results of the test 545 are positive, than there is excess fuel and a step 546 is performed wherein the fuel bar top is determined to be above the waypoint line. If the results of the test 545 are negative, there is a fuel deficit, and a step 547 is performed wherein the fuel bar top is determined to be below the waypoint line. Next, a step 550 is performed wherein the exact position of the fuel bar top with respect to the waypoint line is set equal to the fuel bar offset calculated in step 541.

Steps 551 and 552 are then performed to determine the position of the Bingo fuel indicator. In step 551, the amount of Bingo fuel (BF) is determined using equation 8 below:

$$BF = (\text{MAX RANGE FUEL CONSUMPTION RATE} \times \text{EPD}) + \text{MFR} \tag{8}$$

where the first term is the amount of fuel required to travel the direct route distance to the mission endpoint (EPD) at the maximum range airspeed and the second term is the mission fuel reserve. In step 552, the Bingo fuel offset (BFO) is determined. BFO is the distance below the waypoint line that the Bingo fuel indicator 225 (FIG. 2) is drawn. BFO is determined using equation 9 below:

$$\text{BFO} = (\text{MFR} - \text{BF})/\text{FPL} \tag{9}$$

where FFR is the fuel required to complete the mission and have the desired fuel reserve upon arrival at the final destination. FFR is determined based on the remaining distance to be flown, the planned rate of fuel consumption (based on airspeed, altitude, etc.), and any mission requirements to be completed in the mission, e.g., hover operations, weapons delivery, troop delivery or recovery, etc. It will therefore be understood that MFR is greater than BF because BF is determined based on the direct route distance to the mission endpoint at a rate of fuel consumption corresponding to the maximum range airspeed.

After completion of the time bar and fuel bar subroutines, the steps 555 through 557 are consecutively performed wherein the amount of fuel remaining is updated, the aircraft velocity is determined from the navigational system, and the aircraft position is determined from the navigational system. Next, a test 560 is performed wherein the subroutine determines if the aircraft has reached its final destination. If the results of the test 560 are negative, a test 562 is performed wherein the subroutine determines if the nominal route plan has changed. If the results of the test 562 are positive, the subroutine returns to the step 501 wherein the changed nominal route plan is entered and the display is modified based on the change in the route plan. If the results of the test 562 are negative, the time and fuel displays are updated by returning to the step 508 and performing another cycle of the subroutine. However, if the results of the test 560 are positive, the mission is complete and the subroutines exits in a step 563.

The invention has been described thus far as providing a display the entire height of which corresponds to the total distance to be traveled during a mission and having a waypoint line which corresponds to various waypoints to be achieved during the mission. However, the invention would work equally as well if the total height of the display corresponded to an intermediate point in the mission, and then the scale is renewed after achieving the intermediate point. The intermediate points may correspond to each waypoint line, a primary target position, or the midpoint of the mission. What is important is that the pilot is provided with information indicative of time and fuel which is presented in a concise, expedient manner, so that the pilot may maintain situational awareness without sacrificing safety. The invention is described and illustrated as provided an indication of planned arrival time 220 (FIG. 2) corresponding to the time the aircraft will arrive at the final destination. However, this indicator may be used to indicate mission time. For example, if the entire mission is intended to last one hour, twenty minutes and thirty seconds, then the display would indicate 01:20:30 as the mission time.

The invention is illustrated as using a rectangle to indicate total distance traveled and lines and bars to indicate distance traveled, time and fuel consumption; however, other geometric shapes may be used with the present invention. What is important is that an indicator is provided having a dimension which corresponds to total distance traveled, and that a distance traveled indicator is provided on the dimension to indicate the portion of the total distance traveled. Additionally, a time indicator and a fuel indicator are positioned relative to the distance traveled indicator to indicate the actual time and fuel consumption with respect to planned time and fuel consumption for the distance traveled.

As described herein, the time and fuel display of the present invention may be positioned on a monitor, e.g. flat panel display, within the cockpit. Alternatively, the time and fuel display may be presented on a pilot visor using a head-up display or helmet-mounted display, or it may be positioned on any other suitable display positioned within the cockpit for providing a quick and easy reference for time and fuel information. The invention is described herein as being used for helicopter flight operation; however, the invention may be used on any vehicle (land, sea or air) where information indicative of time and fuel consumption relative to planned time and fuel consumption is relevant.

Although the invention has been described and illustrated with respect to exemplary embodiments thereof, it should be understood by those skilled in the art that the foregoing and various other changes, omissions and additions may be made therein and thereto without departing from the spirit and scope of the present invention

We claim:

1. A time and fuel display symbol for exhibition on a video display for providing a vehicle operator with a visual indication of time consumption and fuel consumption with respect to planned time and fuel consumption during travel of a vehicle over a planned route, said symbol comprising:

a distance symbol a height of which is indicative of the total distance between a first location on said planned route and a second location on said planned route;

a distance traveled indicator located on said distance symbol, the position of said distance traveled indicator being indicative of a portion of said total distance traveled by said vehicle;

a time indicator located on said distance symbol, the position of said time indicator with respect to said distance traveled indicator being indicative of actual time consumption with respect to planned time consumption for said portion of said total distance traveled by said vehicle; and a fuel indicator located on said distance symbol, the position of said fuel indicator with respect to said distance traveled indicator being indicative of actual fuel consumption with respect to planned fuel consumption for said portion of said total distance traveled by said vehicle.

2. A time and fuel display symbol according to claim 1 wherein said total distance traveled is indicative of the distance traveled by said vehicle over said planned route between said first location and said second location.

3. A time and fuel display symbol according to claim 2 further comprising:

at least one intermediate location on said planned route between said first location and said second location, each of said first location, said second location and said intermediate locations being uniquely identified by a waypoint identifier; and waypoint indicating means adjacent to said distance traveled indicator indicative of said waypoint identifier corresponding to said location towards which said vehicle is traveling.

4. A time and fuel display symbol according to claim 3 wherein said first location corresponds to a mission origin and wherein said second location corresponds to a mission endpoint.

5. A time and fuel display symbol according to claim 1 further comprising a mission time display adjacent to said distance symbol indicative of mission time.

6. A time and fuel display symbol according to claim 5 wherein said mission time is indicative of the planned arrival time of said vehicle at said second location.

7. A time and fuel display symbol according to claim 5 wherein said mission time is indicative of the planned amount of time for said vehicle to travel between said first location and said second location over said planned route.

8. A time and fuel display symbol according to claim 3 further comprising a mission time display adjacent to said distance symbol indicative of mission time.

9. A time and fuel display symbol according to claim 8 wherein said mission time is indicative of the planned arrival time of said vehicle at said second location.

10. A time and fuel display symbol according to claim 8 wherein said mission time is indicative of the planned amount of time for said vehicle to travel between said first location and said second location over said planned route.

11. A time and fuel display symbol according to claim 1 further comprising a fuel reserve display adjacent to said distance symbol indicative of the planned amount of reserve fuel said vehicle will have upon arrival at said second location.

12. A time and fuel display symbol according to claim 8 further comprising a fuel reserve display adjacent to said distance symbol indicative of the planned amount of reserve fuel said vehicle will have upon arrival at said second location.

13. A time and fuel display symbol according to claim 1 further comprising a Bingo fuel indicator, the position of said Bingo fuel indicator with respect to said distance traveled indicator being indicative of the amount of fuel required by said vehicle to travel a direct route from said vehicle's current location to said second location at said vehicle's most fuel efficient speed with a planned amount of reserve fuel remaining upon arrival at said second location.

14. A time and fuel display symbol according to claim 1 further comprising a Bingo fuel indicator, the position of said Bingo fuel indicator with respect to said distance traveled indicator being indicative of the amount of fuel required by said vehicle to travel a direct route from said vehicle's current location to a mission endpoint location at said vehicle's most fuel efficient speed with a planned amount of reserve fuel remaining upon arrival at said mission endpoint location.

15. A time and fuel display symbol according to claim 12 further comprising a Bingo fuel indicator, the position of said Bingo fuel indicator with respect to said distance traveled indicator being indicative of the amount of fuel required by said vehicle to travel a direct route from said vehicle's current location to said second location at said vehicle's most fuel efficient speed with a planned amount of reserve fuel remaining upon arrival at said second location.

16. A time and fuel display symbol according to claim 15 wherein said second location corresponds to a mission endpoint location.

17. A time and fuel display symbol according to claim 15 wherein said distance symbol is rectangular in shape, the height of said rectangle being indicative of said total distance.

18. A time and fuel display symbol according to claim 17 wherein said distance traveled indicator is a horizontal line.

19. A time and fuel display symbol according to claim 18 wherein said time indicator is a bar the height of which with respect to said horizontal line is indicative of actual time consumption with respect to planned time consumption for said portion of said total distance traveled by said vehicle.

20. A time and fuel display symbol according to claim 19 wherein said fuel indicator is a bar the height of which with respect to said horizontal line is indicative of actual fuel consumption with respect to planned fuel consumption for said portion of said total distance traveled by said vehicle.

21. A time and fuel display symbol according to claim 20 wherein said first location corresponds to a mission origin and wherein said second location corresponds to a mission endpoint.

22. A time and fuel display system for providing a vehicle operator with a visual indication of time consumption and fuel consumption with respect to planned time and fuel consumption during travel of a vehicle over a planned route, said system comprising:

visual display means;

fuel control mean for providing a fuel level signal indicative of the amount of fuel contained in said vehicle and for providing a fuel consumption signal indicative of the rate fuel is being consumed by said vehicle;

navigation means for providing a position signal indicative of the current navigational position of said vehicle;

signal processing means for storing route plan information consisting of data indicative of specific geographic locations, distances, planned arrival times and planned fuel consumption corresponding to said planned route, said signal processing means being responsive to said fuel level signal, said fuel consumption signal and said position signal for providing a time and fuel display symbol on said visual display means, said time and fuel display symbol including:

a distance symbol a height Of which is indicative of the total distance between a first location on said planned route and a second location on said planned route;

a distance traveled indicator located on said distance symbol, the position of said distance traveled indicator being indicative of it portion of said total distance traveled by said vehicle;

a time indicator located on said distance symbol, the position of said time indicator with respect to said distance traveled indicator being indicative of actual time consumption with respect to planned time consumption for said portion of said total distance traveled by said vehicle; and a fuel indicator located on said distance symbol, the position of said fuel indicator with respect to said distance traveled indicator being indicative of actual fuel consumption with respect to planned fuel consumption for said portion of said total distance traveled by said vehicle.

23. A time and fuel display system according to claim 22 further comprising data input means for inputting said route plan information, said signal processing means being responsive to said data input means for storing said route plan information.

24. A time and fuel display system according to claim 23 wherein said total distance traveled is indicative of the distance traveled by said vehicle over said planned route between said first location and said second location.

25. A time and fuel display system according to claim 24 further comprising:

at least one intermediate location on said planned route between said first location and said second location, each of said first location, said second location and said intermediate locations being uniquely identified by a waypoint identifier; and waypoint indicating means adjacent to said distance traveled indicator indicative of said waypoint identifier corresponding to said location towards which said vehicle is traveling.

26. A time and fuel display system according to claim 25 wherein said first location corresponds to a mission origin and wherein said second location corresponds to a mission endpoint.

27. A time and fuel display system according to claim 23 further comprising a mission time display adjacent to said distance symbol indicative of mission time.

28. A time and fuel display system according to claim 27 wherein said mission time is indicative of the planned arrival time of said vehicle at said second location.

29. A time and fuel display system according to claim 27 wherein said mission time is indicative of the planned amount of time for said vehicle to travel between said first location and said second location over said planned route.

30. A time and fuel display system according to claim 25 further comprising a mission time display adjacent to said distance symbol indicative of mission time.

31. A time and fuel display system according to claim 30 wherein said mission time is indicative of the planned arrival time of said vehicle at said second location.

32. A time and fuel display system according to claim 30 wherein said mission time is indicative of the planned amount of time for said vehicle to travel between said first location and said second location over said planned route.

33. A time and fuel display system according to claim 23 further comprising a fuel reserve display adjacent to said distance symbol indicative of the planned amount of reserve fuel said vehicle will have upon arrival at said second location.

34. A time and fuel display system according to claim 30 further comprising a fuel reserve display adjacent to said distance symbol indicative of the planned amount of reserve fuel said vehicle will have upon arrival at said second location.

35. A time and fuel display system according to claim 23 further comprising a Bingo fuel indicator, the position of said Bingo fuel indicator with respect to said distance traveled indicator being indicative of the amount of fuel required by said vehicle to travel a direct route from said vehicle's current location to said second location at said vehicle's most fuel efficient speed with a planned amount of reserve fuel remaining upon arrival at said second location.

36. A time and fuel display system according to claim 23 further comprising a Bingo fuel indicator, the position of said Bingo fuel indicator with respect to said distance traveled indicator being indicative of the amount of fuel required by said vehicle to travel a direct route from said vehicle's current location to a mission endpoint location at said vehicle's most fuel efficient speed with a planned amount of reserve fuel remaining upon arrival at said mission endpoint location.

37. A time and fuel display system according to claim 34 further comprising a Bingo fuel indicator, the position of said Bingo fuel indicator with respect to said distance traveled indicator being indicative of the amount of fuel required by said vehicle to travel a direct route from said vehicle's current location to said second location at said vehicle's most fuel efficient spewed with a planned amount of reserve fuel remaining upon arrival at said second location.

38. A time and fuel display system according to claim 37 wherein said second location corresponds to a mission endpoint location.

39. A time and fuel display system according to claim 37 wherein said distance symbol is rectangular in shape, the height of said rectangle being indicative of said total distance.

40. A time and fuel display system according to claim 39 wherein said distance traveled indicator is a horizontal line.

41. A time and fuel display system according to claim 40 wherein said time indicator is a bar the height of which with respect to said horizontal line being indicative of actual time consumption with respect to planned time consumption for said portion of said total distance traveled by said vehicle.

42. A time and fuel display system according to claim 41 wherein said fuel indicator is a bar the height of which with respect to said horizontal line being indicative of actual fuel consumption with respect to planned fuel consumption for said portion of said total distance traveled by said vehicle.

43. A time and fuel display system according to claim 42 wherein said first location corresponds to a mission origin and wherein said second location corresponds to a mission endpoint.

* * * * *